Jan. 14, 1969  L. B. STEIN, JR  3,422,315
ELECTRICAL DECODING CIRCUITRY
Filed May 19, 1966  Sheet 1 of 2

INVENTOR
LAURENCE B. STEIN, JR.
BY
Thomson & Mrose
ATTORNEYS

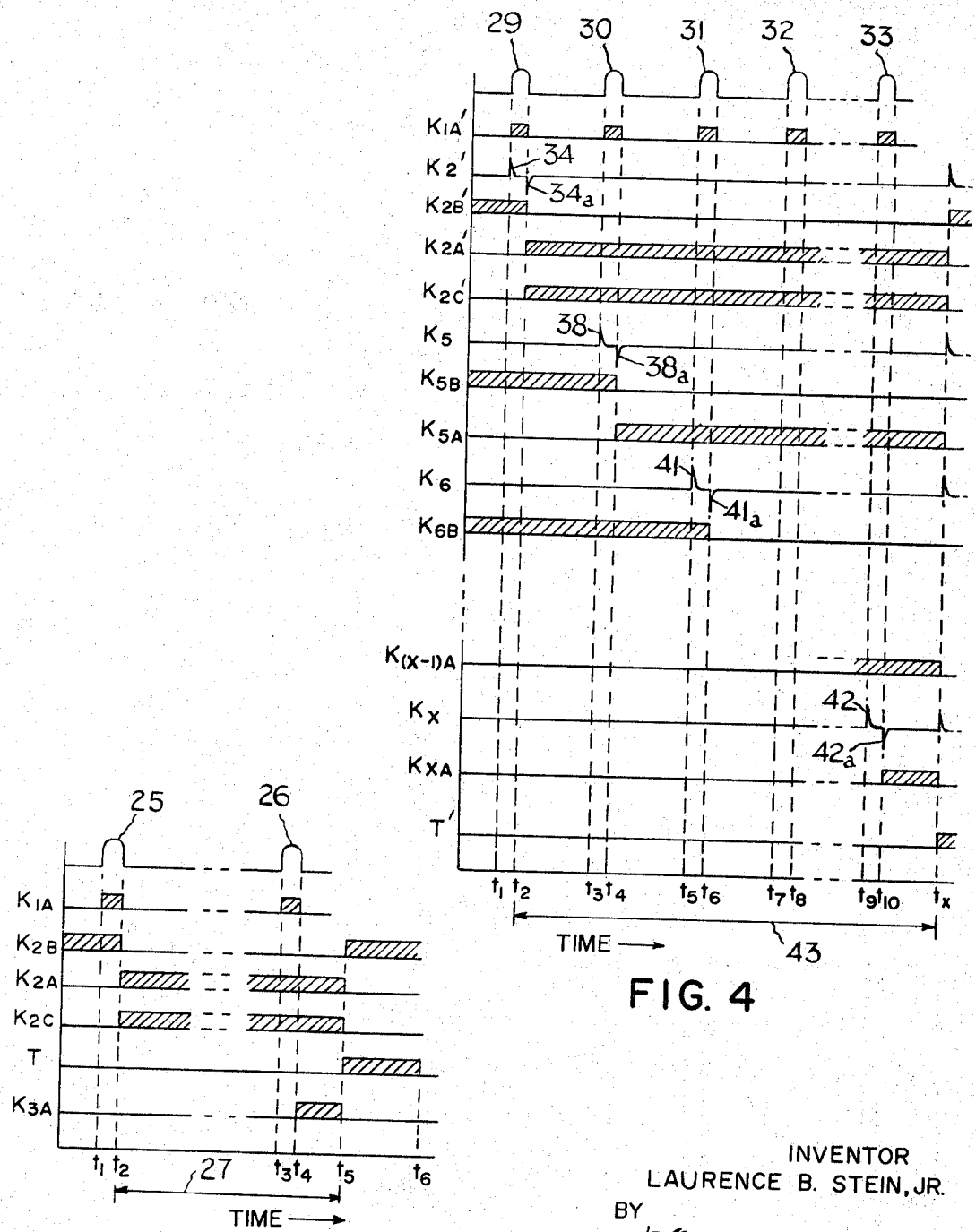

United States Patent Office

3,422,315
Patented Jan. 14, 1969

3,422,315
ELECTRICAL DECODING CIRCUITRY
Laurence B. Stein, Jr., Hingham, Mass., assignor to Sigma Instruments, Inc., Braintree, Mass., a corporation of Massachusetts
Filed May 19, 1966, Ser. No. 551,354
U.S. Cl. 317—22      15 Claims
Int. Cl. H02h 5/00; H02h 1/04; H01h 47/14

ABSTRACT OF THE DISCLOSURE

Electrical impulses, such as those representing fault current conditions in a transmission line, are decoded by circuitry including a group of paralleled charging-and-discharging switching networks which interact in a cascaded relationship. Cooperating timing provisions control automatic resetting of the circuitry when the coding of impulses is not proper to occasion output signalling by the cascaded networks.

---

Figure 1:
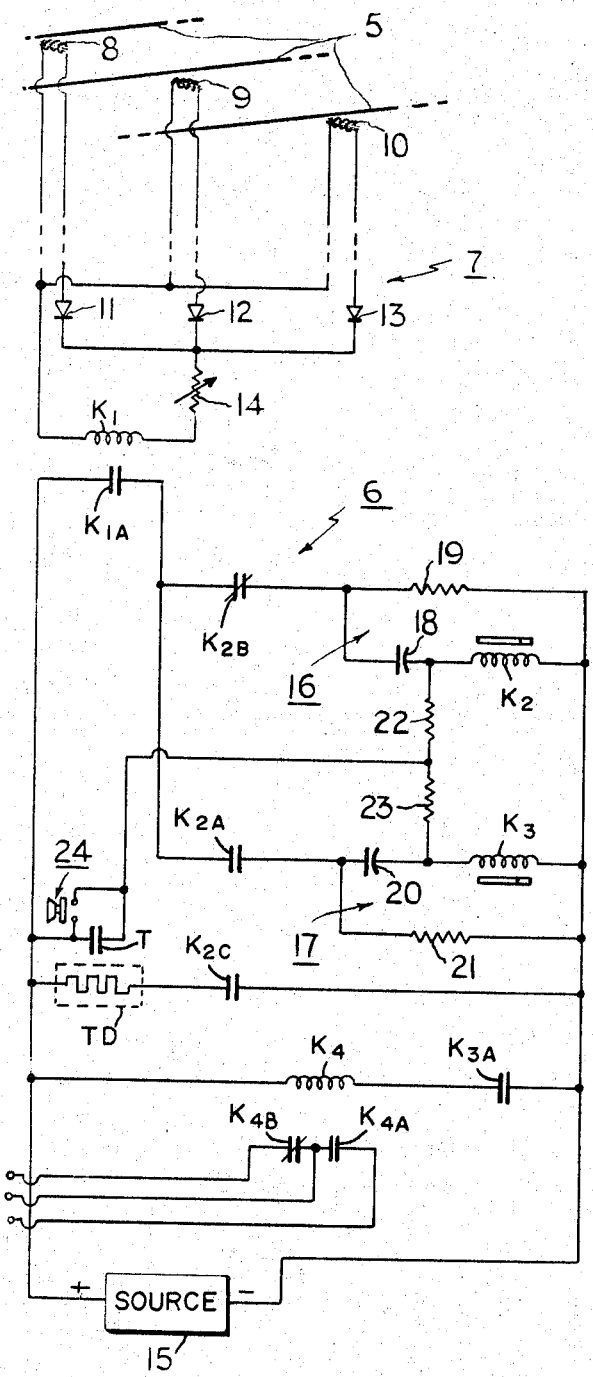

The present invention relates to improvements in the decoding of electrical signals, and, in one particular aspect, to novel and improved automatic electrical detection circuitry of uncomplicated and economical form which reliably translates the recurrent interruptions of electrical impulses within certain intervals into distinctive output signals, for such purposes as controlling the switching in electrical power distribution systems which are subject to faults.

Diverse forms of electrical equipment are known and used for selectively responding to certain electrical signals while remaining passive in the presence of others having quite similar characteristics. Commonly, these employ critically-tuned resonant circuits, or complex electronic networks which analyze pulses, for example. In some instances, it is instead preferred that the translating equipment exploit the recognized advantageous capabilities of electromagnetic relays, which tend to be highly rugged, economical, uncomplicated, reliable in performance over long periods under extremes of operating conditions, and, in particular, effective to cause switching at relatively high power levels. Equipments of this type are especially well suited to control in electrical power distribution systems, where certain loads must be connected and/or disconnected in response to command signals, or where the actuations of high-power switches must be controlled in connection with the sectionalizing of parts of a system which experience faults. Past approaches along such lines have undesirably involved the use of such devices as special-purpose relays with numerous contacts, motorized timers, stepping switches, and critically-charged capacitors. In accordance with the present teachings, however, simple and inexpensive electromagnetic relays may be combined in relatively uncomplicated network relationships with other noncritical low-cost components to provide highly reliable equipment useful in detecting and signalling the unique interruptions of successive electrical impulses only within a predetermined time interval, while reliably discriminating against impulses which are not so related.

It is one of the objects of the present invention, therefore, to provide novel and improved electrical detection circuitry of low-cost uncomplicated form wherein electromagnetic relays promote precise selective responses to time-coordinated electrical impulses.

Another object is to provide unique circuit controllers in which polarized-relay charging circuits are combined to effect reliable output switching upon recurrent interruptions of electrical input signals within a predetermined period which can be set independently of charging and discharging rates.

A further object is to provide a new and advantageous relay-type sectionalizing controller, for power-distribution systems, the operations of which are self-synchronized with fault currents in a manner which avoids accidental opening of an associated sectionalizer while fault conditions persist.

A still further object is to provide unique power-system sectionalizing circuitry which does not require special slaving to recloser switching, and in which intercoupled circuit stages each including a polarized relay and charging capacitor respond in sequence only to recurrent interruptions of fault currents within a prescribed period, the circuitry otherwise being automatically cleared and reset by associated time-delay equipment.

By way of a summary statement of practice of this invention in one of its aspects, the occurrence of fault current in a transmission line first is detected by sensors which energize a relay and thereby close associated main switch contacts during the fault-current interval. Each closure of the relay switch contacts is in turn effective to apply D-C electrical excitation across a group of paralleled charging-and-discharging networks each including the series combination of relay switch contacts and a parallel circuit including a polarized relay coil, a capacitance, and a load-dissipating impedance. The switch contacts of the networks are arrayed such that first only one of the parallel circuits will charge its capacitance upon first closure of the main switch contacts, and such that each succeeding network will be readied for similar charging in sequence by the next-succeeding closures of the main switch contacts following an opening of the main switch contacts and the resultant discharging of the capacitance and reverse switching by the polarized relay in the preceding network of the series. The network relay in the last of the series of parallel networks is effective to open a power-system sectionalizing switch when discharging occurs in that last network, provided a time switch which is energized upon occurrence of discharge in the first network has not meanwhile closed an associated switch causing relay-resetting currents to flow through the networks. This arrangement insures that only a predetermined number of interruptions of fault currents within a predetermined time will result in actuation of the sectionalizing switch device.

Figure 3:
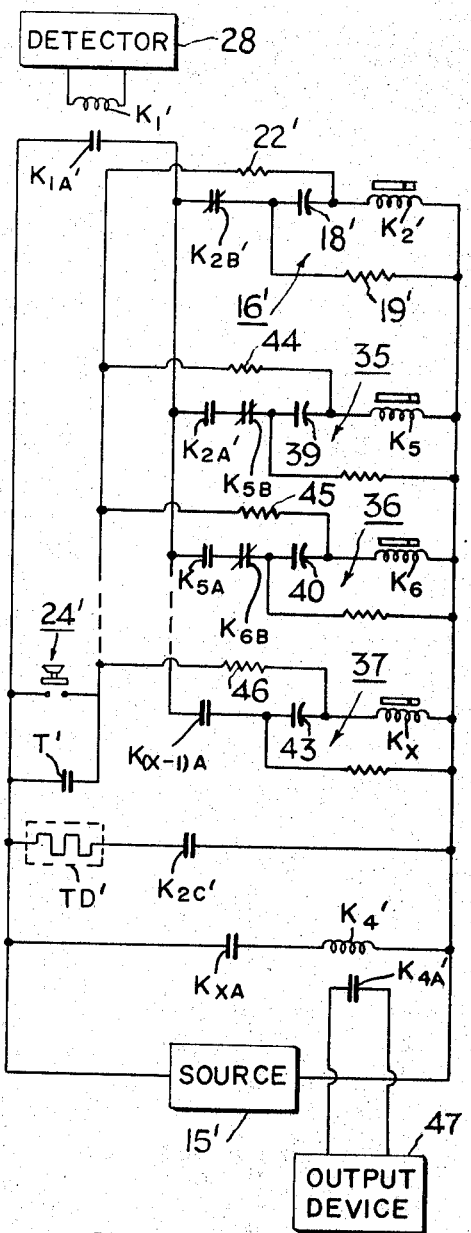

Although the aspects and features of this invention which are believed to be novel are expressed in the appended claims, additional details as to preferred practices and embodiments, and as to the further advantages, objects and features thereof, may be most readily comprehended through reference to the following description taken in connection with the accompanying drawing wherein:

FIGURE 1 illustrates, mainly in schematic form, an improved two-step sectionalizing relay arrangement wherein teachings of the present invention are practiced in connection with an electric power distribution system;

FIGURE 2 graphically characterizes the coordinations in time between fault currents and switch closures in the sectionalizing arrangement of FIGURE 1;

FIGURE 3 is a schematic and block-diagrammed representation of multistaged decoding equipment useful in providing controlled outputs responsive to a multiplicity of input impulse interruptions within a predetermined interval; and FIGURE 4 graphically characterizes the coordinations in time between input impulses and switch closures in the equipment of FIGURE 3.

The power-system apparatus portrayed in FIGURE 1 involves electrical detection and translating equipment in cooperative relationship with electric power distribution lines, such as the section lines 5 which deliver power to loads in an assigned area from a supply substation.

Occurrence of faults in the system result in high current surges which trip protective circuit-breaking equipment and, if the fault is merely transient in character, a reclosing of the circuit should be effected to restore service via the section lines. Commonly, the reclosing is accomplished automatically, at the substation site, and may be attempted a number of times by the recloser there. When it is determined that the fault condition will persist, the line section must be preserved open until appropriate corrective measures have been taken; switches used for such disconnections are generally unsuited to opening the circuitry during intervals when large fault currents are flowing, and it is thus important that these should be actuated only during open periods of the associated reclosers. Automatic circuitry 6 functions to detect and respond to the fault conditions, and, specifically, to trigger sectionalizing switch apparatus only when there have been successive reclosures within a predetermined period of time; moreover, the mode of operation involved is advantageously such as to avoid unintended openings of a sectionalizer, while not requiring provisions for time coordination with the recloser to which it responds.

Detection of fault currents is achieved by way of a detector stage 7 including a relay coil $K_1$, three inductive-type sensors 8–10 associated one with each phase of the power lines 5, three rectifying diodes 11–13, and a sensitivity-control resistance 14. A fault condition on any one or more of the phases will induce sensor currents which, when rectified and limited by the impedance of control element 14, will energize relay coil $K_1$ sufficiently to effect closure of its normally-open contacts $K_{1A}$. The detector is a high-speed unit, capable of closing and opening the relay contacts within but a few milliseconds following the appearance and interruption respectively, of a fault current which typically, may be permitted to persist only for between about 30–50 milliseconds.

Relay contacts $K_{1A}$ are disposed in series with a D-C power source 15, such as a battery, and with each of two unique charging circuits 16 and 17. In addition, the source is connected across two further relay elements, TD and $K_4$, through normally-open relay contacts $K_{2C}$ and $K_{3A}$, respectively. Upon a first brief fault-induced closure of normally-open contacts $K_{1A}$, direct current from source 15 flows in one direction through the first charging circuit 16, through the normally-closed contacts $K_{2B}$ associated with the coil $K_2$ of a polarized relay in that circuit. Capacitance 18 is charged as this particular current flows through the relay coil $K_2$ with which the capacitance is in series, but no relay contact operations are involved because the current is not of the proper direction to so affect the polarized relay. Thereafter, clearing of the fault quickly opens contacts $K_{1A}$, with the result that capacitance 18 then immediately discharges through the local current loop including relay coil $K_2$ and load resistance 19, causing the polarized relay to open its normally-closed contacts $K_{2B}$ and to close its normally-open contacts $K_{2A}$ and $K_{2C}$, and preferably to latch in that position. With closure of contacts $K_{2C}$, the thermal time-delay (such as a bimetal unit) TD commences its operation looking toward ultimate closure of its associated normally-open contacts T after a predetermined period (up to 60 seconds, in a specific example). Meanwhile, if a second fault is detected after the first reclosure and before the expiration of that predetermined period, the resulting closure of contacts $K_{1A}$ will be accompanied by flow of source current through the second charging circuit 17, but not the first, the second circuit having been readied for this by closure of contacts $K_{2A}$ and the first circuit having been inactivated by opening of its contacts $K_{2B}$ when the first circuit discharged itself as described above. Charging of capacitance 20 occurs in the second circuit 17, through the polarized relay coil $K_3$; however, there is no closure of the associated relay contacts $K_{3A}$ until that capacitance subsequently discharges through the local current loop including relay coil $K_3$ and load resistance 21 when and if the second fault is cleared and the main contacts $K_{1A}$ re-open before the expiration of the aforesaid predetermined period. Closure of contacts $K_{3A}$ will immediately cause relay coil $K_4$ to become energized and to open and close respectively, the contacts $K_{4A}$ and $K_{4B}$ which are part of the indicating and sectionalizing switch circuitry involved in isolating the line section after two faults have been cleared within the predetermined preset period. Inasmuch as the sectionalizing switch operates immediately upon closure of $K_{4B}$ following clearance of the second fault, there is no possibility that the vulnerable sectionalizing switching will open during persistence of a fault current; this desirable synchronization occurs automatically as the result of the inherent operating mode of the circuitry 6. Contacts $K_{4A}$ are intended to operate a signalling target or the like in series therewith, or to perform an interlock operation, for example. Load resistances 19 and 21 are of sufficiently high value to permit charging of the associated capacitances 18 and 20, without acting as shorts, while also permitting relatively high discharge current to flow therethrough and through the associated relay windings.

When the first fault is not followed by another within the predetermined critical time period, the second circuit, 17, does not become charged, and the automatic closure of time-delay contacts T results in resetting current flow through resistances 22–23 and relay coils $K_2$ and $K_3$ in the proper direction to insure that all of their associated contacts are restored to the initial normal conditions illustrated. The circuitry is then prepared to detect and decode anew, in the same manner, if subsequent faults develop. Push-button switch 24 enables the circuitry to be reset manually, if desired, by initiating relay re-setting current flows in the same manner as time-delay contacts T.

In FIGURE 2, the sequencing of contact closures in the decoding equipment of FIGURE 1 is shown in relation to the successive fault-related currents symbolized by pulses 25 and 26. Such current pulses are driven through relay coil $K_{1A}$ when faults occur in any one or more of the phases of section lines 5, and may, typically, persist for about 30–50 milliseconds (the times between $t_1$ and $t_2$ and between $t_3$ and $t_4$) before automatic switching disconnects the lines from their associated power supply. The closed conditions for each of the contacts $K_{1A}$, $K_{2B}$ $K_{2C}$, T and $K_{3A}$ are symbolized by the cross-hatched level changes in the graphical portrayals of the open and closed conditions for these contacts. Initially, only contacts $K_{2B}$ are closed, and the decoding circuit 6 remains in a passive state without drawing any current from its source 15 until the detector circuit 7 first responds to occurrence of a fault at time $t_1$ by closing contacts $K_{1A}$. At that juncture, the circuit 16 charges its capacitor 18 quickly, although the associated polarized relay coil $K_2$ cannot then affect its contacts $K_{2A}$, $K_{2B}$ and $K_{2C}$. Capacitance 18 is a relatively noncritical component, in that it does not serve a timing function and need only provide an adequate storage for later actuation of relay coil $K_2$ upon discharging; however, the time constant of the charging path including that capacitance relay coil must be short enough to permit the aforesaid adequate storage in the fault interval $t_1$–$t_2$. The same considerations apply to the capacitance 20 and relay coil $K_3$ in circuit 17, with reference to the comparable fault interval $t_3$–$t_4$.

At time $t_2$, when the first fault is interrupted, the discharging of capacitance 18 in circuit 16 causes polarized relay coil $K_2$ to open contacts $K_{2B}$ and to close contacts $K_{2A}$ and $K_{2C}$. Both of the latter contacts remain closed until time $t_5$ when the time-delay relay coil TD closes its contacts T, whereupon the current forced through relay coil $K_2$ via contacts T and load resistances 22 and 23 will re-set contacts $K_{2A}$, $K_{2B}$ and $K_{2C}$ to their original conditions, as indicated in FIGURE 2. Meanwhile, however, if a second fault-related current pulse 26 appears before time $t_5$, such as in the illustrated interval $t_3$–$t_4$, contacts $K_{1A}$ close again and connect only the circuit 17 for charging from source 15. Polarized relay coil $K_3$ in the latter circuit is so energized by discharging of capacitance 20 at time $t_4$, when the second fault is interrupted, that it closes its associated contacts $K_{3A}$ at about time $t_4$. Thereupon, the relay coil $K_4$ is also energized and actuates its contacts $K_{4A}$ and $K_{4B}$ to induce appropriate signalling and/or triggering of a low-cost switch (not shown) which disconnects lines 5. The critical time span 27 for the system is governed by time-delay contacts 7, which close and thereby reset the decoding circuitry to its original state a predetermined time after a first interruption of a fault current. Unless a second fault current is also interrupted before the expiration of time span 27, the disconnect switch will not be activated, and sectionalizing will not occur. Inasmuch as the equipment responds to successive interruptions of fault currents, the section-line switching will not inadvertently occur during fault intervals while currents are in excess of the switch capacities; this synchronism is intrinsic in the decoding circuit operation. Upon being reset, either automatically or by depression of the push-button 24 (FIGURE 1), the decoding circuitry remains in a passive but ready state enabling it to respond, as intended, to fault conditions which are so related in time as to dictate that sectionalizing be performed. At the expiration of time period 27, whether or not there has been a second fault resulting in operation of the sectionalizer, contacts T of the time delay relay will reset to their initial conditions the entire apparatus, including contacts $K_{2B}$, $K_{2A}$ and $K_{3A}$. Upon opening of contacts $K_{2C}$, the time delay relay TD will commence to reset, and do so in a few seconds at time $t_6$, at which time the equipment is in its original condition.

The usual maximum number of reclosures which is attempted before sectionalizing is effected is about four, and the illustrative two-reclosure system of FIGURE 1 is readily adapted to accommodate a larger number of reclosures by adding on further charging-and-discharging circuits, such as circuit 17. An illustrative arrangement of this type is depicted in FIGURE 3, and lends itself to decoding on the basis of at least four and up to any desired number X of electrical pulse interruptions within any preselected time interval. Detector 28 in that system may comprise a fault-current sensor network, like that of FIGURE 1, or, alternatively, another type of network such as one which translates high-frequency signal bursts into related pulses for excitation of the relay coil $K_1'$ (as an aid to description and understanding, elements which correspond functionally to those of the FIGURE 1 system are identified by the same reference characters, with distinguishing single-prime accents added). When the detector is of the latter type, the decoder may then serve to actuate equipment such as water heaters, power-factor correcting impedance banks, and the like, in response to time-coordinated bursts of electrical signals received at and processed by the detector 28. These signals are of course coded such that they involve a predetermined number of successive interruptions within a predetermined interval. As is shown in FIGURE 4, which is a graphical presentation generally like that of FIGURE 2, each of a group of detected pulses 29–33, not necessarily of the same width or uniform spacing, will cause the normally-open cotacts $K_{1A}'$ of detector relay coil $K_1'$ to assume a closed relationship substantially synchronously therewith. Initially, normally-closed relay contacts $K_{2B}'$ will permit capacitance 18' in the first charging circuit 16' to receive charging current 34 from source 15' at time $t_1$ upon a first closure of contacts $K_{1A}'$ by pulse 29, the other charging circuits, 35–37, being isolated from the source by the normally-open contacts $K_{2A}'$, $K_{5A}$ and $K_{(X-1)A}$, respectively. Discharge current pulse $34_a$ delivered from capacitance 18' at time $t_2$ causes polarized relay coil $K_2'$ to inactivate circuit 16' by opening its contacts $K_{2B}'$ and to ready the next charging circuit, 35, by closing its supply-lead contacts $E_{2A}'$, and, at the same time, to start a predetermined time delay by closing the contacts $K_{2C}'$ in series with the time-delay (example: bimetal) unit TD'. The next closure of detector contacts $K_{1A}'$, by pulse 30, results in a charging current 38 (FIGURE 4) to capacitance 39 in circuit 35, followed by a localized loop current pulse 38 when contacts $K_{1A}'$ open the second time. Thereupon, polarized relay coil $K_5$ opens the contacts $K_{5B}'$ inactivating circuit 35, and closes contacts $K_{5A}$, to ready the next charging circuits, 36, for charging when the third pulse 31 is detected and again closes contacts $K_{1A}'$. The same kind of action occurs in circuit 36, with capacitance 40 being charged by current 41 and then discharging current $41_a$ through polarized relay coil $K_6$; contacts $K_{6B}$ then inactivate circuit 36 and close contacts (not shown) in the supply line to the next-succeeding circuit (not shown), and so on until the final charging circuit, 37, is reached in the cascading of such circuits. That final charging circuit need not inactivate itself after its polarized relay coil $K_x$ has responded to discharge current $42_a$ from its capacitance 43, and therefore, unlike intermediate circuits 35 and 36, it does not include a set of normally closed contacts associated with the polarized relay coil (not shown) of the next-preceding charging circuit (not shown). At a time $t_x$, which follows the interruption of a first detected pulse 29 at time $t_2$ by a predetermined period 43, the time-delay contacts T' are automatically closed and each of the palorized relay coils $K_2'$, $K_5$, $K_6$, etc., and $K_x$ is caused to draw current from source 15' through a load resistance (such as resistances 22', 44, 45 and 46) in a direction which will reset the associated relay contacts to their original conditions. However, if the automatic resetting does not occur before a predetermined number of detected pulses (the last being pulse 33) has been interrupted in the period 43, the output relay $K_4'$ will be energized by closure of the contacts $K_{xA}$, and will result in closure of contacts $K_{4A}'$ controlling the operation of an appropriate output device 47.

The number of detected-pulse interruptions which will cause desired actuation of the output device may be selectably varied by way of a simple selector switch which will connect only the desired number of intermediate charging circuits into the cascaded sequence. In addition, the timing may be varied to suit different needs, and may in some instances be achieved by an alternative device such as a timing motor or the like. Although polarized relays have been depicted and described by way of illustration in preferred embodiments, those skilled in the art will of course recognize that there are functional equivalents which will operate to produce similar useful results; as an example, each polarized relay may be replaced by a dual-coil latching relay in which one of the coils is disposed to carry only the resetting current which restores the associated contacts to desired conditions. Accordingly, it should be understood that the embodiments and practices described and portrayed have been presented by way of disclosures, rather than limitation, and that various modifications, substitutions and combinations may be effected without departure from the spirit and scope of this invention in its broader aspects.

What I claim as new and desire to secure by Letters Patent of the United States is:

1. Electric decoding apparatus comprising a plurality of resettable switching units each responsive to electrical impulsing of a first electrical sense to change electrical conduction conditions of at least one electrical path and to restore said conditions responsive to electrical impulsing of another electrical sense, electrical signal detecting means, means under control of said detecting means for applying electrical impulsing of said first sense to each of said units through predetermined ones of said electrical paths responsive to and substantially synchronously with the termination of each variation in the electrical signals detected by said detecting means, means connecting one of said switching units with said means applying electrical impulsing through a normally-closed one of said electrical paths which is rendered open by impulsing of said first one of said units in said first sense, means connecting another of said switching units with said means applying electrical impulsing through a normally-open one of said electrical paths which is rendered closed by impulsing of said first one of said units in said first sense, output means producing a characterizing electrical output responsive to electrical impulsing of said other of said switching units in said first sense, and timing means responsive to said electrical impulsing in said first sense and applying electrical impulsing of said other electrical sense to said switching units at the end of a predetermined interval following actuation thereof to reset said switching units and thereby restore said conditions.

2. Electrical decoding apparatus as set forth in claim 1 including a source of electrical energy and wherein said means for applying electrical impulsing to each of said units comprises electrical switching means for connecting said source and each of said units.

3. Electrical decoding apparatus as set forth in claim 2 wherein said signal detecting means closes and opens said switching means substantially synchronously with the commencement and termination, respectively, of each variation in said electrical signals detected by said detecting means, and wherein each of said switching units includes means for producing electrical impulsing of said first sense therein responsive to each opening of said switching means when that switching unit is connected with said source through said switching means.

4. Electrical decoding apparatus as set forth in claim 3 wherein said source is a source of unidirectional current, and wherein each of said switching units includes a relay winding and a capacitance connected with said winding for charging by said source and discharging through a load including said winding.

5. Electrical decoding apparatus as set forth in claim 4 wherein said load in each of said switching units includes an impedance paralleled with the series combination of said capacitance with said relay winding, and wherein said timing means applying electrical impulsing of said other electrical sense includes a time-delay relay for electrically connecting said relay winding in each of said switching units across said source to conduct undirectional current of said other sense therethrough and to become reset thereby.

6. Electrical decoding apparatus comprising a plurality of resettable switching units each including a relay winding and a capacitance connected with said winding for electrical charging and discharging therethrough in different directions, each of said relay windings having electrical contacts actuatable thereby from initial settings, a unidirectional-current source, switching means for closing and opening circuit connections between said source and each of said switching units through predetermined ones of said contacts, means connecting a first of said switching units with said source through said switching means and through a normally-closed one of said electrical contacts which is rendered open by discharging of the capacitance through the relay winding in said first of said units, means connecting at least one further said switching units with said source through said switching means and through a normally-open one of said electrical contacts which is rendered closed by discharging of the capacitance through the relay winding in the next-preceding one of said switching units to establish a cascade operating relationship between the successive switching units, output means producing a characterizing electrical output responsive to discharging of the capacitance through the relay winding in the last of the cascaded switching units, and timing means responsive to discharging of the capacitance through the relay winding of said first of said units for drawing current through the relay windings of all of said units in direction which restores said initial settings of said electrical contacts at the end of a predetermined interval.

7. Electrical decoding apparatus as set forth in claim 6 wherein each of said switching units includes the series combination of a capacitance and a relay winding in parallel with a load impedance which completes a discharge path for the capacitance through the winding.

8. Electrical decoding apparatus as set forth in claim 7 including more than two of said resettable switching units, and wherein the connecting means for each cascaded setting unit between the first and the last further includes a normally-closed one of said electrical contacts which is rendered open by discharging of the capacitance through the relay winding in the same said setting unit.

9. Electrical decoding apparatus as set forth in claim 6 wherein said timing means includes a time-delay relay connectable with said source through a normally-open one of said electrical contacts which is rendered closed by discharging of the capacitance through the relay winding of said first of said resettable switching units, and wherein said time-delay relay includes normally-open switch contacts for connecting all of the relay windings of said resettable switching units with said source through load means to draw currents therethrough in direction restoring said initial settings of said electrical contacts.

10. Electrical decoding apparatus as set forth in claim 9 wherein said time-delay relay comprises a thermal time-delay relay, and wherein the relay winding of each of said switching unit comprises a winding of a polarized relay.

11. Electrical decoding apparatus as set forth in claim 6 wherein said output means includes switch contacts for controlling said characterizing electrical output, said switch contacts having an initial setting which is changed responsive to discharging of the capacitance through the relay winding of said cascaded switching units.

12. Electrical decoding apparatus as set forth in claim 11 including an output relay winding in controlling relation to said switch contacts, and means for connecting said output relay winding with said source through a normally-open set of contacts which is rendered closed by discharging of the capacitance through the relay winding of said last of said cascaded switching units.

13. Electrical decoding apparatus as set forth in claim 9 wherein said switching means comprises means for detecting electrical impulses and for closing and opening said circuit connections substantially synchronously with the commencement and termination, respectively, of predetermined characteristics of said impulses.

14. Electrical decoding apparatus as set forth in claim 13 wherein said detector means includes means for sensing fault current conditions in electrical power distribution lines and for closing and opening said circuit connections substantially synchronously with the commencement and interruption, respectively, of fault currents in said lines, and wherein said output means comprises means for actuating circuit-disconnecting switch means to isolate said lines from an electrical power distribution system, whereby said output means responds to a predetermined number of detected interruptions of fault current corresponding to the number of said switching units occurring within said predetermined interval following a first such detected interruption of fault current.

15. Electrical decoding apparatus comprising a plurality of resettable switching units each including a winding of a polarized relay, a capacitance, a load resistance, electrical relay contacts associated with said winding and actuatable between normally-closed and normally-open conditions by flows of unidirectional current through said winding in different directions, and means electrically interconnecting said capacitance and relay winding in a series combination with said load resistance in parallel therewith, said load resistance being of sufficiently high value to permit relatively rapid charging of said capacitance from a source connected across said series combination and discharging of said capacitance through said resistance, a unidirectional electrical power source, means for electrically connecting one of said units with said source for charging of the capacitance therein through normally-closed electrical relay contacts associated with the relay winding therein, means electrically connecting another of said units with said source for charging of the capacitance therein through normally-open electrical relay contacts associated with the relay winding in said one of said units, and output means for producing a characterizing electrical output responsive to actuation of relay contacts associated with the relay winding in said other of said units.

References Cited

UNITED STATES PATENTS 3,158,786  11/1964  Hurtle _____ 317—33
3,307,075  2/1967  Park _____ 317—33

JOHN F. COUCH, *Primary Examiner.*

J. D. TRAMMELL, *Assistant Examiner.*

U.S. Cl. X.R.

317—36, 134, 140